(12) United States Patent
Wang et al.

(10) Patent No.: US 11,144,127 B1
(45) Date of Patent: Oct. 12, 2021

(54) ACTIVE TEXTURE PRESENTATION APPARATUS DRIVEN BY HIGH-DENSITY FLEXIBLE ELECTROMAGNETIC COIL ARRAY

(71) Applicant: Beihang University, Beijing (CN)

(72) Inventors: Dangxiao Wang, Beijing (CN); Yuan Guo, Beijing (CN); Ziqi Wang, Beijing (CN); Yuru Zhang, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 17/282,402

(22) PCT Filed: Oct. 10, 2019

(86) PCT No.: PCT/CN2019/110369
§ 371 (c)(1),
(2) Date: Apr. 2, 2021

(87) PCT Pub. No.: WO2020/211305
PCT Pub. Date: Oct. 22, 2020

(30) Foreign Application Priority Data

Apr. 17, 2019 (CN) .......................... 201910307279.0

(51) Int. Cl.
*G06F 3/01* (2006.01)
*G06F 3/045* (2006.01)
(52) U.S. Cl.
CPC .............. *G06F 3/016* (2013.01); *G06F 3/045* (2013.01); *G06F 2203/04809* (2013.01)
(58) Field of Classification Search
None
See application file for complete search history.

(56) References Cited

U.S. PATENT DOCUMENTS

| 2011/0285666 A1* | 11/2011 | Poupyrev | G06F 3/016 345/174 |
| 2019/0051124 A1* | 2/2019 | Maalouf | H02K 33/02 |
| 2020/0211418 A1* | 7/2020 | Greiner | G09B 21/004 |

FOREIGN PATENT DOCUMENTS

| CN | 101819462 A | 9/2010 |
| CN | 104679241 A | 6/2015 |

(Continued)

OTHER PUBLICATIONS

International Search Report and Written Opinion of the International Searching Authority, dated Jan. 15, 2020, from International Application No. PCT/CN2019/110369, filed on Oct. 10, 2019. 6 pages.

(Continued)

*Primary Examiner* — Stephen T. Reed
(74) *Attorney, Agent, or Firm* — HoustonHogle LLP

(57) ABSTRACT

Disclosed is a texture presentation apparatus driven by a high-density flexible electromagnetic coil array, including a surface layer and a driving layer. The surface layer is in direct contact with the fingertip of a finger to ensure interaction safety of a user, is capable of adjusting the friction force when the finger touches and slides on the surface layer, and has a shielding and protection effect on the driving layer; the driving layer includes a stretchable soft substrate and a plurality of micro driving units, each micro driving unit is independently controllable, the driving layer adjusts the microscopic geometric morphology of a texture surface; the texture presentation apparatus is capable of implementing multi-scale fine texture presentation; when the fingertip comes into contact with the surface layer, the texture presentation apparatus controls, based on different surface textures of an object to be simulated in a virtual environment.

10 Claims, 3 Drawing Sheets

(56) References Cited

FOREIGN PATENT DOCUMENTS

| | | |
|---|---|---|
| CN | 107015643 A | 8/2017 |
| CN | 107077194 A | 8/2017 |
| CN | 110096147 A | 8/2019 |

OTHER PUBLICATIONS

Written Opinion dated Jan. 15, 2020, from International Application No. PCT/CN2019/110369, filed on Oct. 10, 2019. 4 pages.

\* cited by examiner

ACTIVE TEXTURE PRESENTATION APPARATUS DRIVEN BY HIGH-DENSITY FLEXIBLE ELECTROMAGNETIC COIL ARRAY

RELATED APPLICATIONS

This application is a § 371 National Phase Application of International Application No. PCT/CN2019/110369, filed on Oct. 10, 2019, now International Publication No. WO 2020/211305 A1, published on Oct. 22, 2020, which International Application claims priority to Chinese Application 201910307279.0 filed on Apr. 17, 2019, both of which are incorporated herein by reference in their entirety.

TECHNICAL FIELD

The present disclosure relates to a tactile texture presentation apparatus, and in particular, to an active texture presentation apparatus driven by a high-density flexible electromagnetic coil array.

BACKGROUND

In order to enhance immersive interaction with a virtual world, many tactile interaction devices have been developed. Existing devices are mostly wearable or handheld devices. Wearable devices can support multi-finger, multi-gesture and dexterous grasping operations, but most of them have defects such as a heavy weight and difficulty in wearing. Handheld devices do not need to be worn, but they are inflexible and unstretchable and cannot implement multi-scale fine texture presentation. As virtual reality (VR) and robots require more realistic tactile feedback, there is an urgent need to develop new feedback apparatuses to meet the demands of bare-hand interaction without wearing, and multi-haptic (such as softness, texture, and shape) feedback. With a VR helmet, users can feel good haptic feedback in the virtual world, making the users' interaction with the virtual environment smoother and more realistic.

SUMMARY

The present disclosure aims to overcome the defects of the prior art and provides a texture presentation apparatus driven by a high-density flexible electromagnetic coil array, to enhance a user's immersion in a virtual reality interaction and allow the user to touch and operate virtual objects by bare hands in an intuitive and direct manner. The apparatus is flexible and stretchable and can implement multi-scale fine texture presentation.

The technical solution in the present disclosure is as follows: A texture presentation apparatus driven by a high-density flexible electromagnetic coil array includes a surface layer and a driving layer. The surface layer is in direct contact with the fingertip of a finger to ensure interaction safety of a user, is capable of adjusting the friction force when the finger touches and slides on the surface layer, and has a shielding and protection effect on the driving layer; the driving layer includes a stretchable soft substrate and a plurality of micro driving units, each micro driving unit is independently controllable, and the driving layer adjusts the microscopic geometric morphology of a texture surface; the texture presentation apparatus is capable of implementing multi-scale fine texture presentation; when the fingertip comes into contact with the surface layer, the texture presentation apparatus controls, based on different surface textures of an object to be simulated in a virtual environment, each independently controllable micro driving unit in the driving layer to change geometric features of textures presented by the texture presentation apparatus in real time, to realize macroscopic, mesoscopic, and microscopic multi-scale fine texture simulation.

Further, the micro driving unit may be a micro-scale electromagnetic coil array.

Further, the driving layer may further include an electronic circuit, an upper micro-scale magnetic powder unit array, and a lower micro-scale magnetic powder unit array.

Further, the micro-scale electromagnetic coil array, the electronic circuit, the upper micro-scale magnetic powder unit array, and the lower micro-scale magnetic powder unit array are all embedded in the stretchable soft substrate; and the upper micro-scale magnetic powder unit array is located on the top of the stretchable soft substrate, the micro-scale electromagnetic coil array is located in the middle of the stretchable soft substrate, and the lower micro-scale magnetic powder unit array is located at the bottom of the stretchable soft substrate.

Further, a micro-scale electromagnetic coil may be made of a silver-plated material through micro-nano processing technology.

Further, the upper micro-scale magnetic powder unit array and the lower micro-scale magnetic powder unit array may serve as a texture unit and a latching unit, respectively.

Further, the upper micro-scale magnetic powder unit array and the lower micro-scale magnetic powder unit array may be made by mixing silica gel and magnetic powder particles; the magnetic powder particles in the mixed material are evenly distributed; and in a preparation process of the upper micro-scale magnetic powder unit array and the lower micro-scale magnetic powder unit array, an external magnetic field is used to ensure that all magnetic powder particles have magnetic pole directions of upper N and lower S.

Further, during simulation of a soft object that is deformable on a large scale, the micro driving units can realize the deformation and extension along with the stretchable soft substrate.

Further, the driving layer may use an instantaneous active magnetic field generated by the micro-scale electromagnetic coil array together with a steady-state passive magnetic field of the lower micro-scale magnetic powder unit array to reduce power consumption generated by the micro-scale electromagnetic coil array, avoiding a problem of heat generation under high current.

Further, when the micro-scale electromagnetic coil array is energized in a forward direction, the upper micro-scale magnetic powder unit array moves downward under an adsorption force generated by an instantaneous strong magnetic field from the micro-scale electromagnetic coil array, driving the surface layer to deform and form pits, to simulate a surface geometrical morphology of the object to be simulated in the virtual environment; after the micro-scale electromagnetic coil array is powered off, deformation of the surface layer is maintained by the adsorption force of the lower micro-scale magnetic powder unit array and the upper micro-scale magnetic powder unit array; when the surface layer needs to be restored to a flat state, the micro-scale electromagnetic coil array enables reverse energization mode (the micro-scale electromagnetic coil array is energized in a reverse direction), and the upper micro-scale magnetic powder unit array moves upward under a repulsive force generated by the instantaneous strong magnetic field of the micro-scale electromagnetic coil array, making the surface layer return to a zero-deformation state; the micro-scale electromagnetic coil array is powered off, and the surface layer stays in the flat state.

The present disclosure has the following beneficial effects: The micro units are embedded in the silica gel substrate to make the texture presentation apparatus flexible and stretchable. Through the micro-scale electromagnetic coil array, dynamic presentation and detail rendering of macroscopic, mesoscopic, and microscopic multi-scale texture are realized with high spatial resolution, fine control accuracy, and wide adjustment range. By combining the instantaneous active magnetic field generated by the electromagnetic coil with the steady-state passive magnetic field of the flexible magnetic powder array, magnetic field strength is optimized, so that the micro-scale electromagnetic coils can be used to produce a large enough normal texture structure change, reducing the power consumption of the electromagnetic coils, and avoiding the problem of heat generation under high current.

Figure 1A:
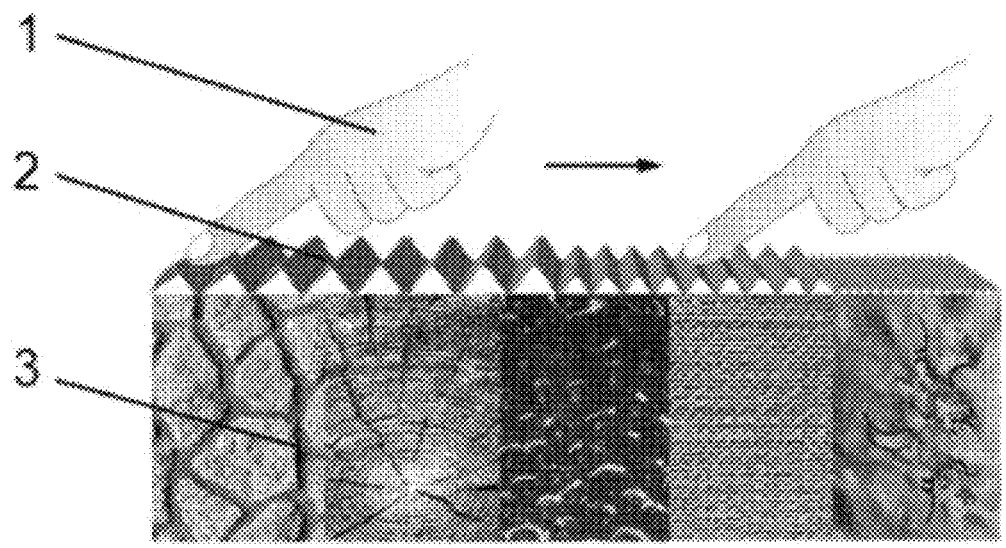
FIG. 1 is a schematic diagram of an overall structure of a texture presentation apparatus.
Figure 1B:
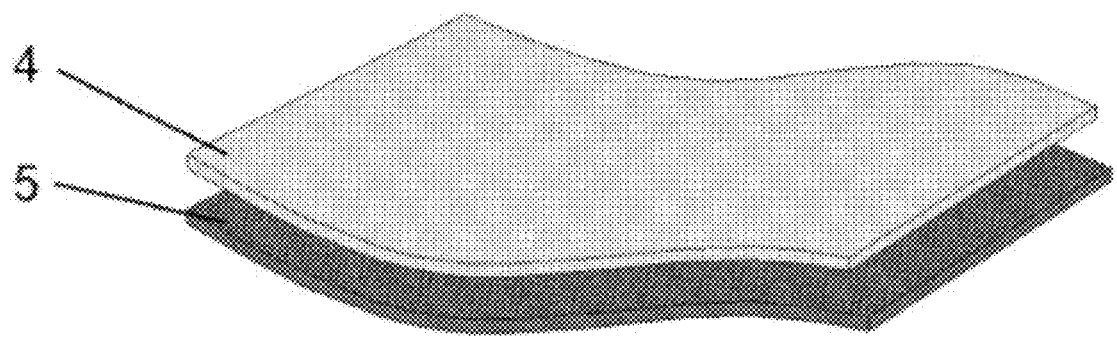
Figure 1C:
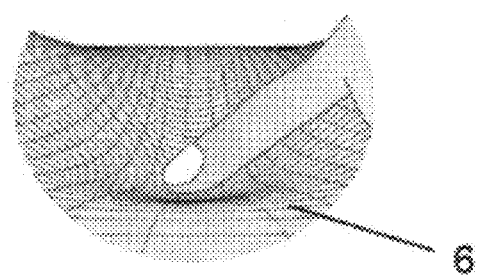
Figure 2:
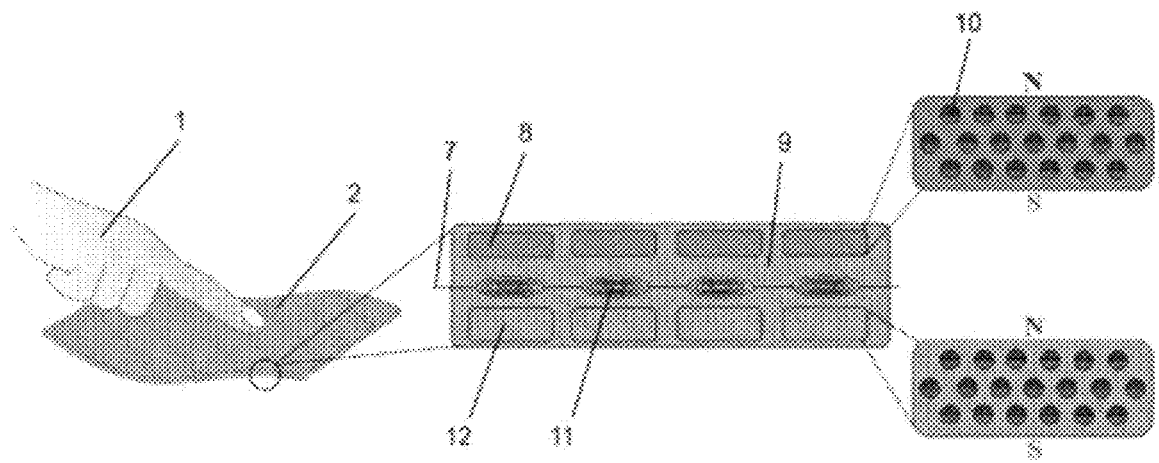
FIG. 2 is a schematic diagram showing a driving layer with no texture presented.
Figure 3:
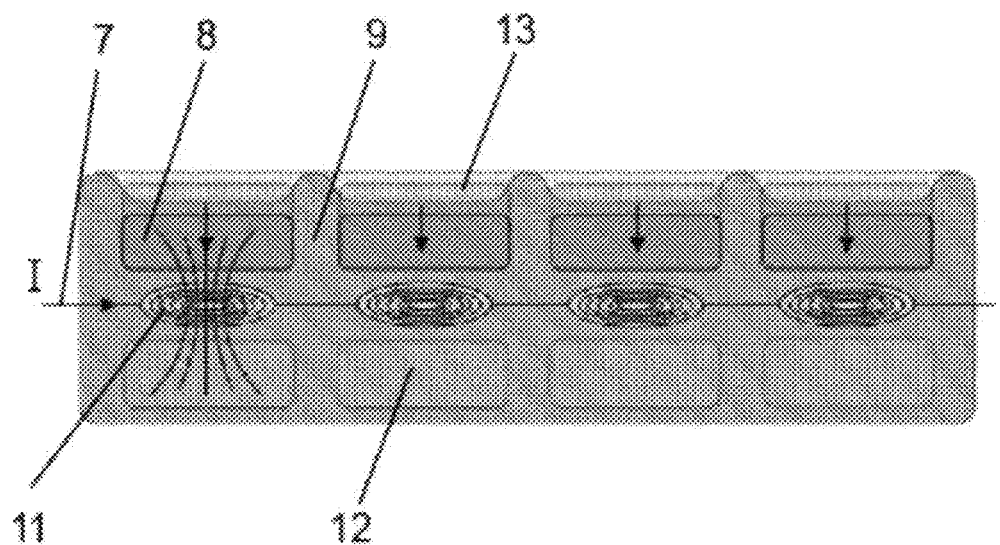
FIG. 3 is a schematic diagram of implementing texture presentation by an active magnetic field of a driving layer.
Figure 4:
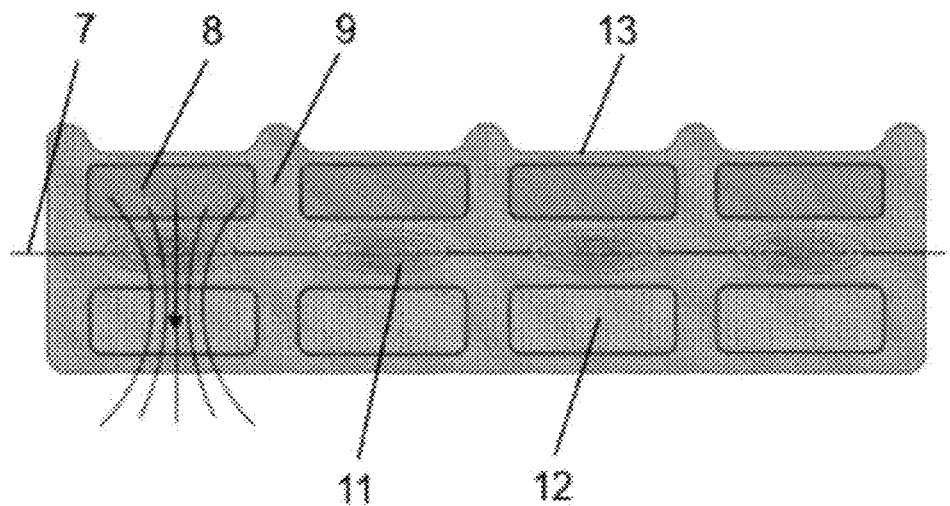
FIG. 4 is a schematic diagram of implementing texture presentation by a passive magnetic field of a driving layer.

In the figures, 1. finger; 2. texture presentation apparatus; 3. object to be simulated; 4. surface layer; 5. driving layer; 6. deformation and extension; 7. electronic circuit; 8. upper micro-scale magnetic powder unit array; 9. stretchable soft substrate; 10. magnetic powder particle; 11. lower micro-scale magnetic powder unit array; 12. micro-scale electromagnetic coil array; and 13. pit.

DETAILED DESCRIPTION

The following clearly and completely describes the technical solutions of the present disclosure with reference to accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the description of the present disclosure, it should be noted that orientations or position relationships indicated by terms "center", "top", "bottom", "left", "right", "vertical", "horizontal", etc. are orientation or position relationships as shown in the drawings, and these terms are just used to facilitate description of the present disclosure and simplify the description, but not to indicate or imply that the mentioned device or elements must have a specific orientation and must be established and operated in a specific orientation, and thus, these terms cannot be understood as a limitation to the present disclosure. Moreover, the terms such as "first", "second" and "third" are used only for the purpose of description and are not intended to indicate or imply relative importance.

In the description of the present disclosure, it should be noted that, unless otherwise clearly specified and limited, meanings of terms "install", "connected with", and "connected to" should be understood in a board sense. For example, the connection may be a fixed connection, a removable connection, or an integral connection; may be a mechanical connection or an electrical connection; may be a direct connection or an indirect connection by using an intermediate medium; or may be intercommunication between two components. A person of ordinary skill in the art may understand specific meanings of the foregoing terms in the present disclosure based on a specific situation.

A texture presentation apparatus 2 driven by a high-density flexible electromagnetic coil array includes a surface layer 4 and a driving layer 5. The surface layer 4 is located on the upper, and the driving layer 5 is located on the lower. The surface layer 4 is in direct contact with the fingertip of a user finger 1 to ensure interaction safety of a user, is capable of adjusting the friction force when the finger 1 touches and slides on the surface layer 4, and has a shielding and protection effect on the driving layer 5. The driving layer 5 includes a plurality of micro driving units, each micro driving unit can be independently controllable, and the driving layer 5 can adjust the microscopic geometric morphology of a texture surface. The texture presentation apparatus 2 can realize multi-scale fine texture presentation. When the fingertip of the finger 1 comes into contact with the surface layer 4, the texture presentation apparatus 2 controls, based on different surface textures (such as stone, wood, cloth, or silk) of an object to be simulated in a virtual environment, each independently controllable micro driving unit in the driving layer 5 to change geometric features of textures presented by the texture presentation apparatus in real time, to realize macroscopic (1-10 mm), mesoscopic (0.5-1 mm), and microscopic (0.1-0.5 mm) multi-scale fine texture simulation.

A substrate material is flexible and stretchable. During simulation of a soft object that is deformable on a large scale, the micro driving units can realize the deformation and extension 6 along with the stretchable soft substrate.

The micro driving units are a micro-scale electromagnetic coil array 11. The driving layer 5 further includes an electronic circuit 7, an upper micro-scale magnetic powder unit array 8, and a lower micro-scale magnetic powder unit array 12. The micro-scale electromagnetic coil array 11, the electronic circuit 7, the upper micro-scale magnetic powder unit array 8, and the lower micro-scale magnetic powder unit array 12 are all embedded in the stretchable soft substrate 9. The upper micro-scale magnetic powder unit array 8 is located on the top of the stretchable soft substrate 9, the micro-scale electromagnetic coil array 11 is located in the middle of stretchable soft substrate 9, and the lower micro-scale magnetic powder unit array 12 is located at the bottom of stretchable soft substrate 9. Through the power-on/off of the micro-scale electromagnetic coil array 11 and the "relay" control of a passive magnetic field of the lower micro-scale magnetic powder unit the array 12, the deformation of the upper micro-scale magnetic powder unit array 8 is realized, thereby changing the surface textures of the texture presentation apparatus 2.

The micro-scale electromagnetic coil array 11 is made of silver-plated material through micro-nano processing technology, and has the characteristics of being stretchable, low resistance, and high current. The upper micro-scale magnetic powder unit array 8 and the lower micro-scale magnetic powder unit array 12 are made by fully mixing silica gel and magnetic powder particles 10 through a planetary mixer, ensuring that the magnetic powder particles 10 in the mixed material are evenly distributed. In a preparation process of the upper micro-scale magnetic powder unit array 8 and the lower micro-scale magnetic powder unit array 12, an external magnetic field such as a permanent magnet or an electromagnetic coil is used to ensure that all magnetic powder particles 10 have magnetic pole directions of upper N and lower S. The upper micro-scale magnetic powder unit array 8 and the lower micro-scale magnetic powder unit array 12 serve as a texture unit and a latching unit, respectively. Replace the paragraph beginning at page 6, line 23, in the specification as originally filed, with the following rewritten paragraph:

The micro-scale electromagnetic coil arrays 11 in the driving layer 5 can be actively controlled individually. When the micro-scale electromagnetic coil array 11 is not powered on, the upper micro-scale magnetic powder unit array 8 (texture unit) is in a flat state, and the texture presentation apparatus 2 presents no texture. The driving layer 5 uses an instantaneous active magnetic field generated by the micro-scale electromagnetic coil array 11 together with a steady-state passive magnetic field of the lower micro-scale magnetic powder unit array 12 to reduce power consumption of the electromagnetic coils, avoiding a problem of heat generation under high current.

When the micro-scale electromagnetic coil array 11 is energized in a forward direction, the upper micro-scale magnetic powder unit array 8 moves downward under an adsorption force generated by the instantaneous strong magnetic field from the micro-scale electromagnetic coil array 11, driving the surface layer to deform and form pits 13, to simulate a surface geometrical morphology of the object to be simulated in the virtual environment. After 100 milliseconds, the micro-scale electromagnetic coil array 11 is powered off, and the deformation of the surface layer is maintained by the adsorption force of the lower micro-scale magnetic powder unit array 8 (texture unit) and the upper micro-scale magnetic powder unit array 12 (latching unit). When the surface layer needs to be restored to the flat state, the micro-scale electromagnetic coil array 11 enables reverse energization mode, and the upper micro-scale magnetic powder unit array 8 (texture unit) moves upward under a repulsive force generated by the instantaneous strong magnetic field from the micro-scale electromagnetic coil array 11, pushing the surface layer to return to a zero-deformation state. After 100 milliseconds, the micro-scale electromagnetic coil array 11 is powered off, and the surface layer stays in the flat state.

The foregoing embodiments are preferred embodiments of the present disclosure. However, the embodiments of the present disclosure are not limited by the foregoing embodiments. Any other changes, modifications, replacements, combinations and simplifications made without departing from the spirit and principle of the present disclosure should all be equivalent replacement manners, and fall within the protection scope of the present disclosure.

What is claimed is:

1. A texture presentation apparatus driven by a high-density flexible electromagnetic coil array, comprising:
   a surface layer and a driving layer, wherein
   the surface layer is in direct contact with the fingertip of a finger to ensure interaction safety of a user, is capable of adjusting the friction force when the finger touches and slides on the surface layer, and has a shielding and protection effect on the driving layer;
   the driving layer comprises a stretchable soft substrate and a plurality of micro driving units, each micro driving unit is independently controllable, and the driving layer adjusts the microscopic geometric morphology of a texture surface;
   the texture presentation apparatus is capable of implementing multi-scale fine texture presentation; when the fingertip comes into contact with the surface layer, the texture presentation apparatus controls, based on different surface textures of an object to be simulated in a virtual environment, each independently controllable micro driving unit in the driving layer to change geometric features of textures presented by the texture presentation apparatus in real time, to realize macroscopic, mesoscopic, and microscopic multi-scale fine texture simulation.

2. The texture presentation apparatus driven by a high-density flexible electromagnetic coil array according to claim 1, wherein the micro driving units are a micro-scale electromagnetic coil array.

3. The texture presentation apparatus driven by a high-density flexible electromagnetic coil array according to claim 2, wherein the driving layer further comprises an electronic circuit, an upper micro-scale magnetic powder unit array, and a lower micro-scale magnetic powder unit array.

4. The texture presentation apparatus driven by a high-density flexible electromagnetic coil array according to claim 3, wherein the micro-scale electromagnetic coil array, the electronic circuit, the upper micro-scale magnetic powder unit array, and the lower micro-scale magnetic powder unit array are all embedded in the stretchable soft substrate; and the upper micro-scale magnetic powder unit array is located on the top of the stretchable soft substrate, the micro-scale electromagnetic coil array is located in the middle of the stretchable soft substrate, and the lower micro-scale magnetic powder unit array is located at the bottom of the stretchable soft substrate.

5. The texture presentation apparatus driven by a high-density flexible electromagnetic coil array according to claim 2, wherein a micro-scale electromagnetic coil is made of a silver-plated material through micro-nano processing technology.

6. The texture presentation apparatus driven by a high-density flexible electromagnetic coil array according to claim 3, wherein the upper micro-scale magnetic powder unit array and the lower micro-scale magnetic powder unit array serve as a texture unit and a latching unit, respectively.

7. The texture presentation apparatus driven by a high-density flexible electromagnetic coil array according to claim 3, wherein the upper micro-scale magnetic powder unit array and the lower micro-scale magnetic powder unit array are made by mixing silica gel and magnetic powder particles; the magnetic powder particles in the mixed material are evenly distributed; and in a preparation process of the upper micro-scale magnetic powder unit array and the lower micro-scale magnetic powder unit array, an external magnetic field is used to ensure that all magnetic powder particles have magnetic pole directions of upper N and lower S.

8. The texture presentation apparatus driven by a high-density flexible electromagnetic coil array according to claim 1, wherein during simulation of a soft object that is deformable on a large scale, the micro driving units can realize the deformation and extension along with the stretchable soft substrate.

9. The texture presentation apparatus driven by a high-density flexible electromagnetic coil array according to claim 3, wherein the driving layer uses an instantaneous active magnetic field generated by the micro-scale electromagnetic coil array together with a steady-state passive magnetic field of the lower micro-scale magnetic powder unit array to reduce power consumption generated by the micro-scale electromagnetic coil array, avoiding a problem of heat generation under high current.

10. The texture presentation apparatus driven by a high-density flexible electromagnetic coil array according to claim 4, wherein when the micro-scale electromagnetic coil array is energized in a forward direction, the upper micro-scale magnetic powder unit array moves downward under an adsorption force generated by an instantaneous strong magnetic field from the micro-scale electromagnetic coil array, driving the surface layer to deform and form pits, to simulate a surface geometrical morphology of the object to be simulated in the virtual environment; after the micro-scale electromagnetic coil array is powered off, deformation of the surface layer is maintained by the adsorption force of the lower micro-scale magnetic powder unit array and the upper micro-scale magnetic powder unit array; when the surface layer needs to be restored to a flat state, the micro-scale electromagnetic coil array enables a reverse energization mode, and the upper micro-scale magnetic powder unit array moves upward under a repulsive force generated by the instantaneous strong magnetic field of the micro-scale electromagnetic coil array, making the surface layer return to a zero-deformation state; the micro-scale electromagnetic coil array is powered off, and the surface layer stays in the flat state.

* * * * *